US011431405B2

(12) United States Patent
Prinz

(10) Patent No.: US 11,431,405 B2
(45) Date of Patent: Aug. 30, 2022

(54) METHOD FOR PACKET TRANSMISSION OF DATA

(71) Applicant: FREQUENTIS AG, Vienna (AT)

(72) Inventor: Richard Prinz, Vienna (AT)

(73) Assignee: Frequentis AG, Vienna (AT)

( * ) Notice: Subject to any disclaimer, the term of this patent is extended or adjusted under 35 U.S.C. 154(b) by 85 days.

(21) Appl. No.: 16/830,743

(22) Filed: Mar. 26, 2020

(65) Prior Publication Data

US 2020/0313756 A1    Oct. 1, 2020

(30) Foreign Application Priority Data

Mar. 26, 2019  (AT) ................. A502622019

(51) Int. Cl.
*H04B 7/185*  (2006.01)

(52) U.S. Cl.
CPC ..... *H04B 7/18513* (2013.01); *H04B 7/18521* (2013.01); *H04B 7/18584* (2013.01)

(58) Field of Classification Search
CPC ............ H04B 7/18513; H04B 7/18521; H04B 7/18584; H04B 7/185; H04B 7/18545; H04B 7/18547; H04B 7/18554
See application file for complete search history.

(56) References Cited

U.S. PATENT DOCUMENTS 5,365,520 A    11/1994  Wang et al.
5,410,728 A    4/1995   Bertiger et al.
(Continued)

FOREIGN PATENT DOCUMENTS

CN    104579454 A    4/2015
CN    105490729 A  * 4/2016
(Continued)

OTHER PUBLICATIONS

Shacham N.: "Protocols for multi-satellite networks" In: MILCOM 88, 21st Century Military Communications—What's Possible?, Conference Record, Military Communications Conference, Oct. 23-26, 1988 (Oct. 23, 1988), pp. 501-505, vol. 2, DOI:10.11909/MILCOM.1988.13438.

(Continued)

*Primary Examiner* — Shah M Rahman
(74) *Attorney, Agent, or Firm* — Laurence A. Greenberg; Werner H. Stemer; Ralph E. Locher

(57) ABSTRACT

A method provides packet transmission of data between two terminal devices via at least one flying object. The flying objects are moving within a given swarm of flying objects and the flying objects are disposed in a grid being characterized by a number of flight paths. One flying object from the swarm of the flying objects is determined to be a reference flying object and each of the flying objects is assigned a position. Coordinate values of a receiving flying object within the swarm of the flying objects is derived from a respective data packet being transmitted. A number of sequential single transmissions for a transmittal of data between a transmitting flying object and the receiving flying object is performed. Each single transmission within the swarm of the flying objects occurs only between two respective flying objects which are topologically neighboring and in direct communication with each other.

8 Claims, 5 Drawing Sheets

(56) References Cited

U.S. PATENT DOCUMENTS

| | | | | |
|---|---|---|---|---|
| 5,455,961 | A * | 10/1995 | Nakagawa | H04B 7/208 455/12.1 |
| 5,530,909 | A * | 6/1996 | Simon | H04W 40/02 455/11.1 |
| 5,666,648 | A * | 9/1997 | Stuart | H04B 7/195 455/13.1 |
| 5,678,175 | A * | 10/1997 | Stuart | H04B 7/195 455/12.1 |
| 6,018,659 | A | 1/2000 | Ayyagari et al. | |
| 6,178,163 | B1 * | 1/2001 | Yuan | H04B 7/195 370/393 |
| 6,219,617 | B1 | 4/2001 | Dreischer et al. | |
| 6,263,466 | B1 | 7/2001 | Hinedi et al. | |
| 7,171,158 | B2 | 1/2007 | Rosen et al. | |
| 2001/0000455 | A1 * | 4/2001 | Chao | H04B 7/18589 370/316 |
| 2005/0108374 | A1 * | 5/2005 | Pierzga | H04B 7/18504 709/223 |
| 2006/0158373 | A1 * | 7/2006 | Kamei | G01S 19/43 342/357.41 |
| 2014/0002293 | A1 * | 1/2014 | Behrens | H04B 7/2041 342/36 |
| 2014/0129075 | A1 | 5/2014 | Carleton | |
| 2016/0112117 | A1 * | 4/2016 | Platzer | H04B 7/195 370/316 |
| 2018/0083741 | A1 * | 3/2018 | Motoyoshi | H04L 5/0053 |
| 2018/0084476 | A1 * | 3/2018 | Kay | H04B 7/195 |
| 2019/0181947 | A1 * | 6/2019 | Schloemer | H04B 7/18521 |
| 2019/0238216 | A1 * | 8/2019 | Avellan | H04B 7/024 |
| 2020/0350981 | A1 * | 11/2020 | Schloemer | H04B 7/18521 |

FOREIGN PATENT DOCUMENTS

| | | | | |
|---|---|---|---|---|
| CN | 108768504 | A | | 11/2018 |
| CN | 109560862 | A * | 4/2019 | H04B 7/18521 |
| EP | 0365885 | A2 | | 5/1990 |
| EP | 0563572 | A2 | | 10/1993 |
| EP | 0837567 | A2 | | 4/1998 |
| EP | 0887656 | A1 | | 12/1998 |
| EP | 1079546 | A2 | | 2/2001 |
| EP | 1122894 | A2 | | 8/2001 |
| JP | 2003244212 | A * | | 8/2003 |

OTHER PUBLICATIONS

Walke Bernhard: "Mobilfunknetze und ihre Protokolle 2, Buendelfunk, schnurlose Telefonsysteme, W-ATM Hiperlan, Satellitenfunk, UPT", Springer Wiesbaden, Nov. 2001 (Nov. 1, 2001), pp. 417-419, ISBN: 978-3-663-05907-3—English abstract.

* cited by examiner

METHOD FOR PACKET TRANSMISSION OF DATA

CROSS-REFERENCE TO RELATED APPLICATION

This application claims the priority, under 35 U.S.C. § 119, an Austrian application AT A50262/2019, filed Mar. 26, 2019; the prior application is herewith incorporated by reference in its entirety.

BACKGROUND OF THE INVENTION

Field of the Invention

The invention relates to a method for packet transmission of data between at least two terminal devices via at least one flying object according to the independent apparatus claim and a method for packet transmission of data between at least two terminal devices via at least one satellite according to the independent method patent claim.

In presently known communication systems which enable a data transmission by means of flying objects, a bidirectional telecommunication between two terminal devices located on the ground is produced through a flying object, such as a satellite. In this process, a link is established, for example from a satellite telephone to a communications satellite, such as a geostationary satellite, and the data transmission occurs directly from the transmitter to the receiver through this geostationary satellite. However, the coverage in the polar regions may be greatly restricted or entirely absent. Alternatively, a data transmission can also occur from the transmitter to a satellite, which transmits the data to one or more other non-geostationary satellites, which relay the data back to the receiver on the ground. For this purpose, satellite constellations are used, i.e., a number of mutually coordinated satellites, which encircle the earth in the same direction at a constant distance from the earth, such as Walker polar constellations. The data being relayed is forwarded by a known packet switching process from one satellite to the next within the satellite constellation. The target address of a particular data packet is determined in this case with a longest prefix match method, for example, based on the target address transmitted with the respective data packet. Since the transmission pathways are not fixed, however, some of the satellites serving as switching stations may become overloaded.

BRIEF SUMMARY OF THE INVENTION

The problem which the invention proposes to solve is therefore to provide a simple method for the packet transmission of data between flying objects which assures a fast relaying of the data packets to a receiving flying object and at the same time avoids the known drawbacks.

The invention solves this problem with a method for packet transmission of data between at least two terminal devices via at least one flying object according to the independent apparatus patent claim.

According to the invention, it is provided that:
a) the flying objects are moving within a given swarm of flying objects,
b) the swarm of flying objects contains a number of flying objects which are respectively moving on flight paths, especially closed flight paths,
c) wherein the individual flying objects are arranged in a grid which is characterized by a number of flight paths,
d) a number of flying objects are moving in succession, especially equidistant from each other, on each flight path, so that each of these flying objects of the flight path is in respective communication with a preceding flying object and a following flying object,
e) the individual flying objects are moving on multiple flight paths such that each time there are arranged in a given orientation to a respective flight path an associated neighboring flying object of a right-hand neighboring flight path looking in the flight direction and an associated neighboring flying object of a left-hand neighboring flight path looking in the flight direction and in particular they are in communication with the respective flying object for at least a portion of the flight path,
f) one flying object from the swarm of flying objects is determined to be a reference flying object,
g) each of the flying objects is assigned a position, especially a two-dimensional position containing multiple, especially two coordinate values within the swarm of flying objects based on its position relative to the reference flying object,
  gi) wherein those flying objects which are situated on the same flight path are assigned the same coordinate value of the first coordinate,
  gii) wherein those flying objects which are in communication with each other as associated neighboring flying objects of a left-hand and a right-hand neighboring flight path are assigned the same coordinate value of the second coordinate,
h) the coordinate values of a receiving flying object within the swarm of flying objects are derivable from a respective data packet being transmitted,
i) a number of sequential single transmissions is performed for the transmittal of data between a transmitting flying object and a receiving flying object,
  ii) wherein each single transmission within the swarm of flying objects occurs only between two respective flying objects which are topologically neighboring and in direct communication with each other, and
j) during the process of the single transmission from the respective flying object where the data packet is located that is being transmitted, a topologically neighboring flying object is selected, especially a neighboring flying object or preceding flying object or following flying object, with the aid of which the coordinate value of the receiving flying object which is derivable from the data packet is selected and the data packet is sent to this selected neighboring flying object.

This procedure makes it possible to assign characteristic coordinate values or identifiers to flying objects within a swarm of flying objects, wherein the coordinate values of a receiving flying object can be derived from the data packet being transmitted. Thus, advantageously, information about the layout of the swarm of flying objects or its dimensions, the number of flight paths and the number of lines of mutually neighboring flying objects is sufficient for a quick relaying of the data packets.

This procedure is advantageously not tied to a particular setting or a special type of flying objects and it can be used in different fields with variable network topology, where the relations between neighboring elements remain unchanged.

An especially simple data relaying between terminal devices positioned on the ground by means of a swarm of flying objects can be accomplished if:
a) at least two terminal devices positioned on the ground are brought into communication respectively with at least one of the flying objects from the swarm of flying objects, each of the terminal devices being assigned respectively one communication address, especially a distinct address,
b) wherein a data packet is sent from one of the terminal devices as a transmitting terminal device to the respective other terminal device as a receiving terminal device, the data packet containing a communication address assigned to the receiving terminal device,
c) wherein the data packet is relayed by the transmitting terminal device to one of the flying objects as a transmitting flying object,
d) wherein a receiving flying object is determined by the transmitting flying object, which stands in data communication with the receiving terminal device,
e) wherein the data packet is relayed from the transmitting flying object to the receiving flying object according to the invention, and
f) wherein the data packet is relayed from the receiving flying object to the receiving terminal device.

In the case of a longer lasting conversation or a data transmittal requiring a longer time, an especially fast and reliable determination of the receiving flying object can be assured if:
a) the individual flying objects of the swarm of flying object are divided into clusters, each time one of the flying objects of the cluster being determined to be a cluster registration flying object,
b) wherein individual terminal devices which stand in data communication with a flying object of the cluster are registered through this flying object with the cluster registration flying object,
c) wherein in the event that a data link is to be established according to the invention:
  ci) a query is sent from the transmitting flying object to the individual cluster registration flying objects as to whether the particular receiving terminal device stands in a data link with a flying object associated with this cluster registration flying object, and
  cii) any coordinate values, especially the two-dimensional coordinate values of the receiving flying object regarding the query are sent back by the cluster registration flying object to the transmitting flying object based on this query, and
d) a data link is established by the transmitting flying object to the receiving flying object having so reported back, in order to bring about the data communication.

The invention furthermore relates to a method for packet transmission of data between at least two terminal devices via at least one satellite:
a) wherein the satellites are moving within a given satellite constellation around the earth,
b) wherein the satellite constellation contains a number of satellites which are respectively moving on a non-geostationary orbit around the earth,
c) wherein the individual satellites are arranged in a grid which is characterized by a number of orbits, and
d) wherein an orbit extends respectively in a circle or ellipse around the earth, especially on one side of the earth from a first pole to an opposite second pole and then on the other side of the earth from the second pole to the first pole,
e) wherein a number of satellites are moving in succession, especially equidistant from each other, on each orbit, so that each of these satellites of the orbit is in respective communication with a preceding orbital satellite and a following orbital satellite,
f) wherein the individual satellites are moving on multiple orbit, such that each time there are arranged in a given orientation to a respective orbit an associated neighboring satellite of a right-hand neighboring orbit looking in the flight direction and an associated neighboring satellite of a left-hand neighboring orbit looking in the flight direction and in particular they are in communication with the respective satellite for at least a portion of the orbit,
g) wherein one satellite from the satellite constellation is determined to be a reference satellite,
h) wherein each of the satellites is assigned a position, especially a two-dimensional position comprising multiple, especially two coordinate values within the satellite constellation based on its position relative to the reference satellite,
  hi) wherein those satellites which are situated on the same orbit are assigned the same coordinate value of the first coordinate,
  hii) wherein those satellites which are in communication with each other as associated neighboring satellites of a left-hand and a right-hand neighboring orbit are assigned the same coordinate value of the second coordinate,
i) wherein the coordinate values of a receiving satellite within the satellite constellation are derivable from a respective data packet being transmitted,
j) wherein a number of sequential single transmissions is performed for the transmittal of data between a transmitting satellite and a receiving satellite,
  ji) wherein each single transmission within the satellite constellation occurs only between two respective satellites which are topologically neighboring and in direct communication with each other,
k) wherein during the process of the single transmission from the respective satellite where the data packet is located that is being transmitted, a topologically neighboring satellite is selected, especially a neighboring satellite or preceding satellite or following satellite, with the aid of which the coordinate value of the receiving satellite which is derivable from the data packet is selected and the data packet is sent to this selected neighboring satellite.

This procedure makes it possible to assign characteristic coordinate values or identifiers within the satellite constellation to individual satellites. These coordinate values or identifiers can be used in satellite-specific or satellite constellation-specific prefixes for the IP addresses of the hosts and routers on board the satellites within the satellite constellation. In this way, the coordinate values of a receiving satellite are easy to derive from the data packet being transmitted.

Thus, advantageously, information about the layout of the satellite constellation or its dimensions, the number of orbits and the number of lines of mutually neighboring satellites is sufficient for a quick relaying of the data packets being transmitted from a transmitting satellite in a series of single transmissions between respective neighboring satellites to the receiving satellite.

An especially simple data transmission between terminal devices positioned on the ground via a satellite constellation can be accomplished if:
a) at least two terminal devices positioned on the ground are brought into communication respectively with at least one of the satellites of the satellite constellation, each of the terminal devices being assigned respectively one communication address, especially a distinct address,
b) wherein a data packet is sent from one of the terminal devices as a transmitting terminal device to the respective other terminal device as a receiving terminal device, the data packet containing a communication address assigned to the receiving terminal device,
c) wherein the data packet is relayed by the transmitting terminal device to one of the satellites as a transmitting satellite, d) wherein a receiving satellite is determined by the transmitting satellite, which stands in data communication with the receiving terminal device,
e) wherein the data packet is relayed from the transmitting satellite to the receiving satellite according to the invention, and
f) wherein the data packet is relayed from the receiving satellite to the receiving terminal device.

A quick relaying of the data being transmitted is facilitated, since the transmitting and receiving terminal devices each have a communication address which is characteristic of a position on the earth and which contains for example no coordinate values which are used for the relaying of data packets between satellites.

Since a fixed communication address is assigned to the receiving terminal device for the time during which it is in data communication with the satellite constellation and this is relayed along with the data packet being transmitted, that receiving satellite which is currently in data communication with the receiving terminal device can advantageously be determined in reliable manner, so that the data packet can be relayed quickly to it based on the coordinate values assigned to this receiving satellite within the satellite constellation.

In the case of a longer lasting conversation or a data transmittal requiring a longer time, an especially fast and reliable transmittal of data packets between terminal devices positioned on the earth by means of satellites can be accomplished if:
a) the individual satellites in the satellite constellation are divided into clusters, each time one of the satellites of the cluster being determined to be a cluster registration satellite,
b) wherein individual terminal devices which stand in data communication with a satellite of the cluster are registered through this satellite with the cluster registration satellite,
c) wherein in the event that a data link is to be established according to the invention:
  ci) a query is sent from the transmitting satellite to the individual cluster registration satellites as to whether the particular receiving terminal device stands in a data link with a satellite associated with this cluster registration satellite, and
  cii) any coordinate values, especially the two-dimensional coordinate values of the receiving satellite regarding the query are sent back by the cluster registration satellite to the transmitting satellite based on this query, and
d) a data link is established by the transmitting satellite to the receiving satellite having so reported back, in order to bring about the data communication.

Within such a cluster in the satellite constellation, the individual satellites relay information as to whether a terminal device is currently in data communication with them to the cluster registration satellites. Thus, by a query to the cluster registration satellites, the coordinate values of the receiving satellite which is in data communication with the receiving terminal device can be determined especially quickly.

The terminal devices positioned on the earth or the ground can be mobile terminal devices such as mobile or satellite telephones or also stationary terminal devices such as ground stations. Such mobile or stationary terminal devices may differ in the type of link to a satellite or a flying object. For example, mobile transmitting and receiving terminal devices can be connected by means of user links to flying objects or satellites, while stationary terminal devices such as ground stations can be connected via feeder links. However, such a distinction in the link is in no way mandatory for the feasibility of a method according to the invention.

Basically, for example, the following transmission paths are possible in a method for packet transmission of data according to the invention: one or more mobile transmitting terminal devices and one or more mobile receiving terminal devices within the satellite constellation or the swarm of flying objects are in communication with the same or different satellites or flying objects.

In this case, for example, data being relayed is sent from a transmitting terminal device by means of a transmitting satellite, with which the transmitting terminal device is in data communication, to the receiving satellite which is in communication with the receiving terminal device, and then relayed from the receiving satellite to the receiving terminal device.

One or more mobile transmitting terminal devices within the satellite constellation or the swarm of flying objects are in communication with the same or different satellites or flying objects, while one or more stationary terminal devices or ground stations are in communication with satellites or flying objects and in addition with a terminal device, such as the public Internet, which is not connected directly to the satellites or flying objects.

In this case, for example, data is sent from the transmitting terminal device via a transmitting satellite to a receiving satellite, in whose coverage territory the ground station is located, and which is connected via its feeder link to the ground station, and relayed further to the ground station. The data is then relayed from the ground station to the further receiving terminal device.

One or more stationary terminal devices or grounds stations within the satellite constellation or the swarm of flying objects are in communication with the same or different satellites or flying objects, and in addition with a transmitting terminal device that is not connected directly to the satellites or flying objects, while one or more mobile receiving terminal devices are likewise in communication with satellites or flying objects.

In this case, for example, data is sent from the transmitting terminal device via the ground station to a transmitting satellite, in whose coverage territory the ground station is located. The data is then relayed to a receiving satellite, which is connected via its user link to the receiving terminal device, and sent on further to the receiving terminal device.

As a further variant, both a mobile transmitting terminal device and a mobile receiving terminal device may each be in communication with a ground station, and each time only the ground stations are in communication with the satellites of the satellite constellation or the flying objects of the swarm of flying objects.

In this case, for example, data is sent from the mobile transmitting terminal device via a first ground station to a transmitting satellite, in whose coverage territory the first ground station is located. The data is then relayed to a receiving satellite, in whose coverage territory a second ground station is located, which is in communication with the mobile receiving terminal device. The data is further sent from the receiving satellite, which is connected by its feeder link to the second ground station, to the second ground station and then relayed from this to the mobile receiving terminal device.

Further benefits and embodiments of the invention will emerge from the description and the accompanying drawings.

The invention is represented schematically in the following with the aid of especially advantageous, but not limiting exemplary embodiments in the drawings, and it shall be described as an example with reference to the drawings.

Other features which are considered as characteristic for the invention are set forth in the appended claims.

Although the invention is illustrated and described herein as embodied in a method for packet transmission of data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
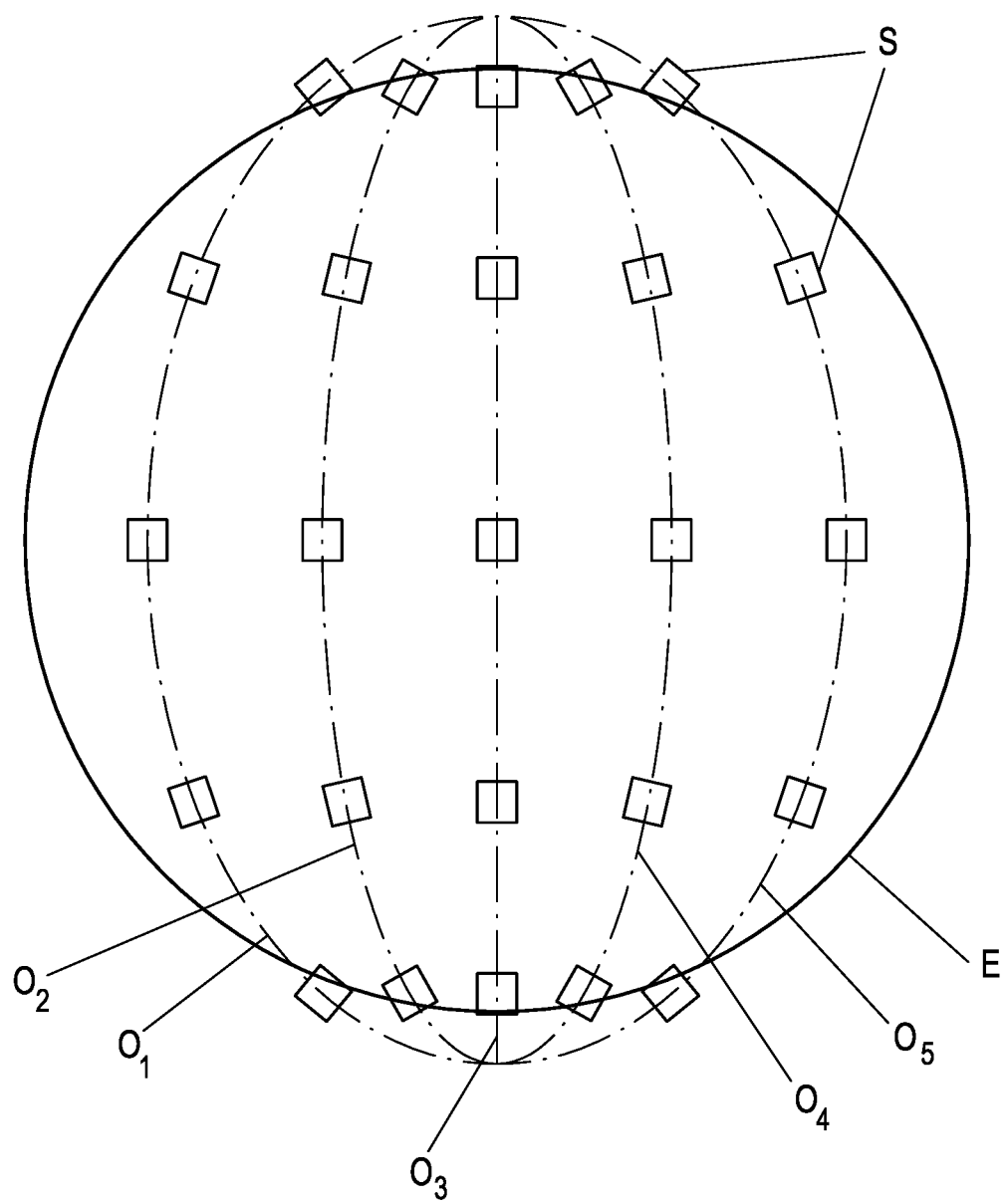
FIG. 1 is a schematic representation of orbits along which a number of satellites are circling the earth.

Referring now to the figures of the drawings in detail and first, particularly to FIG. 1 thereof, there is shown a schematic representation of a satellite constellation, such as can be used for a method according to the invention for a packet transmission of data. Satellites S move here within this predetermined satellite constellation around the earth E, which is shown schematically as a sphere in FIG. 1. The satellite constellation contains a plurality of satellites S, each of them moving on a non-geostationary orbit $O_1, \ldots, O_5$ or trajectory around the earth E. In the exemplary embodiment shown, low earth orbiting (LEO) satellites are used, i.e., satellites moving in low trajectories around the earth.

While the area covered by an individual satellite S within such a satellite constellation is smaller in comparison to the coverage of a geostationary satellite, the satellite constellation contains a large number of satellites S, which move around the earth at great angular velocity, so that a continuous area coverage is assured, even in the polar regions.

The method according to the invention can be used basically with satellite constellations having different orbital structures, whose topology is similar to a Walker constellation. Within such a Walker constellation, for example, all orbits $O_1, \ldots, O_5$ have the same orbital inclination relative to a reference plane, and the equatorial plane can be used for example as the reference plane.

In the exemplary embodiments in FIGS. 1 to 4, the satellite constellation is such a Walker constellation. The Walker star satellite constellation in FIGS. 1 to 4 contains for example 50 satellites, where ten satellites S each are moving on five orbits $O_1, \ldots, O_5$ at an altitude of around 780 km with a velocity of around 27,000 km and orbital periods of around 100.5 minutes. The radius of the region on earth that is covered by these satellites is around 2200 km. A stationary or mobile terminal device on the earth thus remains for a few minutes within the region covered by a single satellite.

Within the satellite constellation, the individual satellites S are arranged in a grid, which is characterized by a number of orbits $O_1, \ldots, O_5$ or trajectories. Each orbit $O_1, \ldots, O_5$ describes a circular trajectory, which extends e.g. on one side of the earth from north to south and then on the other side of the earth from south to north, thereby forming a closed circular trajectory. The orbits $O_1, \ldots, O_5$ can intersect each other in a star shape above the geographical south pole SP and the geographical north pole NP, as can be seen in FIG. 2.

Figure 2:
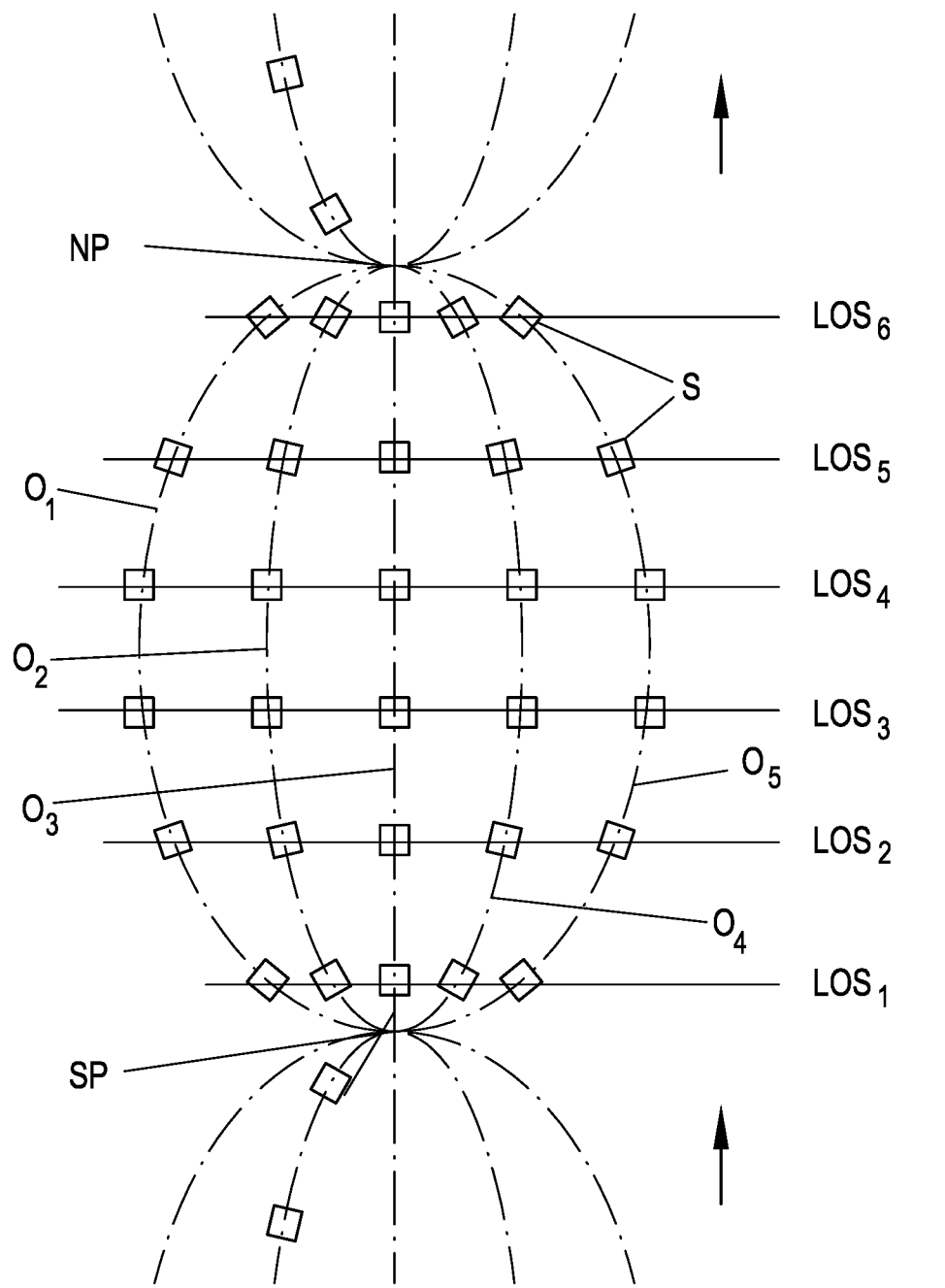
FIG. 2 is an illustration showing a detail view of a gridlike satellite constellation of FIG. 1.

In the exemplary embodiment of FIG. 2, a representation of such a satellite constellation with five orbits $O_1, \ldots, O_5$ and six satellite lines $LOS_1, \ldots, LOS_6$ is shown schematically. In the exemplary embodiment of FIG. 2, the orbits $O_1, \ldots, O_5$ cross each other in a star pattern in the region of the south pole SP and the north pole NP. If a satellite S for example finds itself on the orbit $O_2$ westward or to the left of the orbit $O_3$, which is represented in FIG. 2 as a straight line, and is approaching the geographical north pole NP from the geographical south pole SP, the distance between the orbit $O_2$ and the orbit $O_3$ will decrease until it crosses the orbit $O_3$ above the north pole NP and the satellite S continues its movement on the orbit $O_2$ eastward or to the right of the orbit $O_3$. The satellite S then moves further on the orbit $O_2$ eastward or to the right of the orbit $O_3$, until it finally reaches the geographical south pole SP, where the orbit $O_2$ again crosses the orbit $O_3$ and the satellite S then continues its movement westward or to the left of the orbit $O_3$. The satellites are arranged on the individual orbits $O_1, \ldots, O_5$ such that they cross the north pole NP and the south pole SP slightly staggered in time and/or altitude, so that a collision is ruled out.

On each of the orbits $O_1, \ldots, O_5$ a plurality of satellites S are moving, being arranged at equal distances in succession in the exemplary embodiment shown. This equidistant arrangement, however, is in no way mandatory, and the method for data transmission according to the invention can also be implemented with a different satellite arrangement, so long as it produces a basically gridlike arrangement of the satellites S, in which each satellite S maintains its position within the grid of orbits $O_1, \ldots, O_5$ and satellite lines $LOS_1, \ldots, LOS_6$, i.e., coordinate values within the satellite constellation.

Each of the satellites S of an orbit $O_1, \ldots, O_5$ stands in communication respectively with a preceding orbital satellite and a following orbital satellite. This means that a particular satellite S stands in communication each time with the satellite in front of it and the satellite behind it on the particular orbit O, looking in the flight direction.

The individual satellites S move on multiple orbits $O_1, \ldots, O_5$, so that in a given orientation to the respective orbit O under consideration each satellite on the particular orbit O is associated with an associated neighboring satellite of a right-hand neighboring orbit, e.g., situated eastward of the particular orbit O, and an associated neighboring satellite of a left-hand neighboring orbit, e.g., situated westward of the particular orbit O. A respective neighboring satellite S stands in communication with its associated neighboring satellite at least for a portion of the orbit O, for example, outside the polar regions.

At the seam, i.e., at the margin of the satellite constellation, where the orbits $O_1$ and $O_5$ are situated in the exemplary embodiment shown, each satellite S stands in data communication only with an associated neighboring satellite of a right-hand or left-hand neighboring orbit, in addition to its preceding orbital satellite and its following orbital satellite.

Each satellite S, moving for example on the orbit $O_1$, stands in communication only with the satellite situated respectively in front of it and behind it in the direction of flight, and an associated neighboring satellite of the right-hand neighboring orbit, situated eastward of the respective orbit $O_1$, in this case being the orbit $O_2$. Each satellite S, moving on the orbit $O_5$, stands in communication only with an associated neighboring satellite of the left-hand neighboring orbit, situated westward of the respective orbit $O_5$, in this case being the orbit $O_4$, in addition to its preceding orbital and its following orbital satellite.

Within a satellite constellation with satellites S in near-earth trajectories, the satellites S usually stand in communication with each other by high-frequency or optical inter-satellite links. Such satellites S may also have user links and feeder links, i.e., transmitting and receiving links for mobile terminal devices or stationary terminal devices such as base stations, stationed on the earth. Such links usually support network protocols such as IP protocols.

User and feeder links are transmitting and receiving links, respectively, which are used for different purposes. User links are used for mobile user terminal devices, such as satellite telephones, and feeder links are used for data links to stationary terminal devices such as ground stations of a satellite operator. Ground stations are usually present only at a few selected locations on the earth E. They serve for relaying data between the satellite constellation and the terrestrial Internet, for example, and for monitoring and control of the satellites S by the satellite operator. User and feeder links may also be configured alternatively as combined links. A method for packet data transmission according to the invention is possible with no problems for both forms of configuration.

Figure 3:
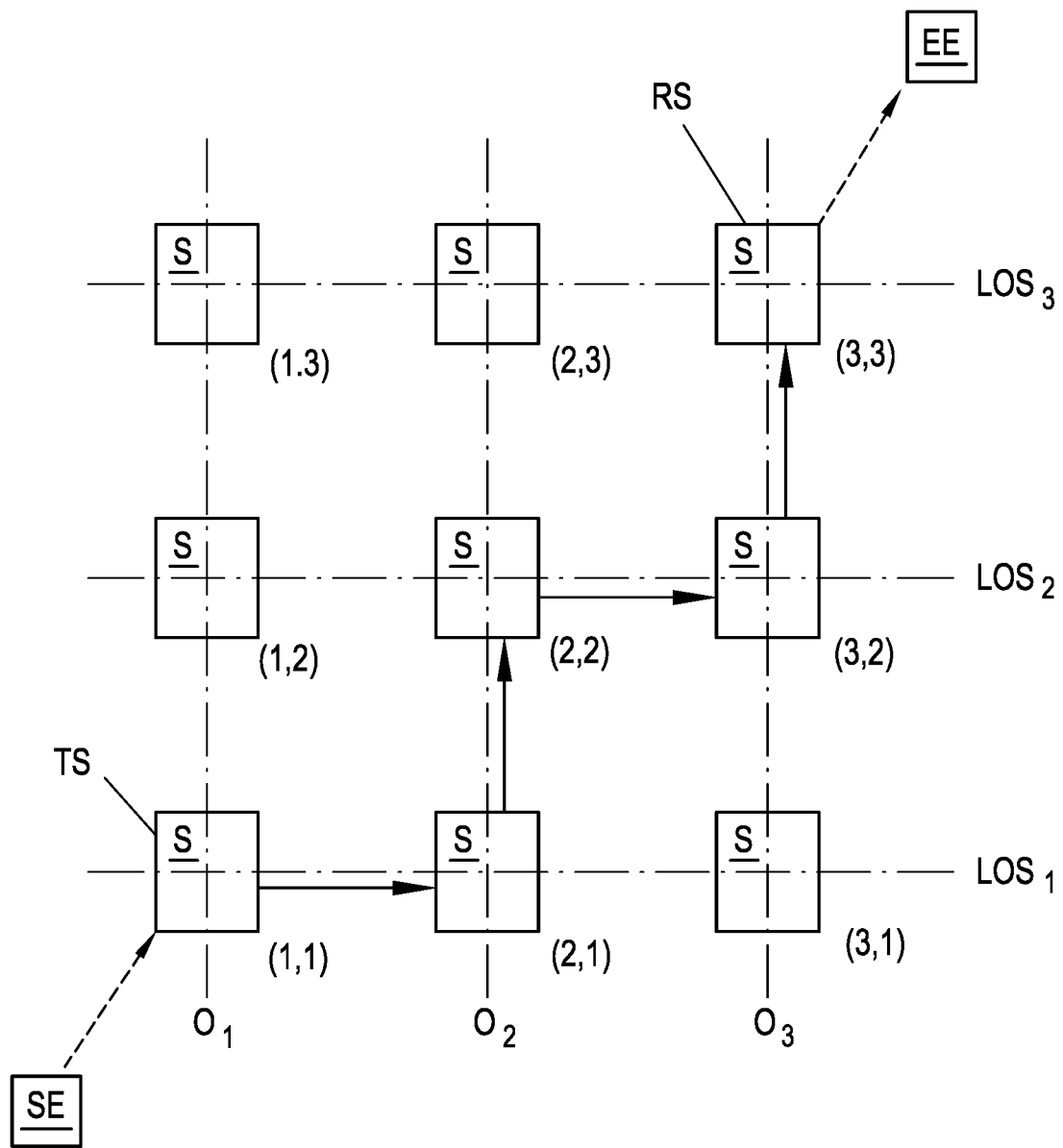
FIG. 3 is a block diagram showing a course of a data transmission in a segment of the satellite constellation of FIG. 1 and FIG. 2.

As can be seen in FIG. 2 and FIG. 3, each of the satellites S is assigned coordinate values within the satellite constellation based on its position within the grid of orbits $O_1, \ldots, O_5$ and satellite lines $LOS_1, \ldots, LOS_6$. In the exemplary embodiment shown in FIG. 3, there are specifically two coordinate values which indicate a two-dimensional position within the satellite constellation. Alternatively, the position information may also comprise only one coordinate value, or more than two coordinate values.

One satellite S of the satellite constellation is determined to be a reference satellite. In the exemplary embodiment, the satellite S situated in the grid of FIG. 3 on the first orbit $O_1$ and the satellite line $LOS_1$ is determined to be the reference satellite and it is assigned the coordinate value (1,1) based on its position in the satellite constellation. Those satellites S which are situated on the same orbit $O_1, \ldots, O_3$ are assigned the same coordinate value of the first coordinate, while those satellites S which are moving respectively on the left-hand or right-hand neighboring orbits and stand in communication with a particular satellite S are assigned the same coordinate value of the second coordinate.

Now, if a transmitting satellite TS receives a data packet to be transmitted, it will derive the coordinate values of the receiving satellite RS within the satellite constellation from the target address of the data packet being transmitted. No routes are stored on the routers aboard the satellite S. Instead, the data packet is routed with the aid of an algorithm and with the aid of the extracted target coordinates.

The routing of the data packets occurs dynamically, for example with the aid of a heuristic algorithm for finding a path in an undirected graph on a sphere or a portion of a sphere. Different kinds of algorithm can be implemented, such as the preferring of horizontal or vertical paths on the basis of the extracted coordinate values or target coordinates of the particular data packets. Base stations or transmitting terminal devices SE and receiving terminal devices EE on the earth E have no such coordinate information in their IP addresses.

For example, each satellite S starting with the transmitting satellite TS can compute the Manhattan distance, e.g., as described at https://de.wikipedia.org/wiki/Manhattan-Metrik or https://en.wikipedia.org/wiki/Taxicab_geometry, each of them retrieved on 20 Feb. 2019, between itself and the receiving satellite RS. The transmitting satellite TS then sends the data packet, taking into account e.g. the configured ISL preference, i.e., horizontal or vertical, and the availability of the preferred ISL, to the next satellite S via this ISL. If this ISL is not available, the next best ISL in terms of the Manhattan distance is chosen.

If this ISL also is not available, the ISL will be chosen that is opposite the first chosen ISL. If this one also is not available, the ISL which is opposite the second optimal ISL will be chosen. In no case, however, will a packet be relayed on the ISL on which it was received. By contrast with known search algorithms, such as A*, as described at https://de.wikipedia.org/wiki/A*-Algorithmus, retrieved on 20 Feb. 2019, or BFS, as described at https://de.wikipedia.org/wiki/A*-Algorithmus, retrieved on 20 Feb. 2019, advantageously no state information about the search is stored on a satellite S or relayed to the next satellite S.

For the transmittal of data between the transmitting satellite TS, which has received the data packet being sent for transmission, and the particular receiving satellite RS, a number of sequential single transmissions is performed. Principles from Software Defined Networking are used for the routing of the data packets within the satellite constellation.

No direct position information will be exchanged between the satellites S of the satellite constellation, for example through routing protocols. The routers on board the individual satellites S within the satellite constellation only have information about the respective layout of the satellite network for the routing of the data packets, such as the size of the network, the number of orbits $O_1, \ldots, O_5$ or the number of satellite lines $LOS_1, \ldots, LOS_6$. Furthermore, only the availability status of the immediately neighboring satellites is known to the routers on board the satellites S, since they are in a direct data link with them. If a neighboring satellite S or its interface to a satellite S is lost, this satellite S will implicitly recognize the loss in that the data link is no longer available on the physical layer. Furthermore, no status information is exchanged with the lost or other satellites S.

In order to select the shortest path to the receiving satellite RS, the transmitting satellite TS therefore first determines the coordinate values of the receiving satellite RS within the satellite constellation and then relays the data packet to one of the topologically neighboring satellites S which are in direct communication with the receiving satellite RS. Such a data transmission is understood as being a single transmission.

"Topologically neighboring" in the context of the invention is used meaning that a communication exists between the respective satellites S or flying objects F at least for a partial region of the respective orbit O or flight path FB. Such a permanent communication occurs, e.g., between a satellite S and its preceding or following orbital satellite.

Outside of the polar regions, a respective satellite S is also in communication with its associated neighboring satellite of a right-hand neighboring orbit or a left-hand neighboring orbit. The respective neighboring satellite S relays the data packet arriving at it once more to one of its topologically neighboring satellites and so forth, until the data packet finally reaches the receiving satellite RS. In this way, the data packet is relayed in a succession of such single transmissions from the transmitting satellite TS to the receiving satellite RS.

A first exemplary embodiment of a method according to the invention for the packet transmittal of data between two satellites shall be described in the following with the aid of FIG. 3. In the exemplary embodiment of FIG. 3, the satellite TS with the coordinate values (1,1) obtains a data packet and determines from its satellite-specific IP prefix that the satellite with the coordinate values (3,3) is the receiving satellite RS. Now, in order to transmit the data packet on the fastest path from the satellite S (1,1) to the satellite S (3,3), the data packet is at first relayed in a series of single transmissions first to the neighboring satellite S (2,1) on the orbit $O_2$ and the same satellite line $LOS_1$. The data packet is then sent to the satellite S (2,2) on the orbit $O_2$ and the satellite line $LOS_2$, to the satellite S (3,2) on the orbit $O_3$ and the satellite line $LOS_2$ and finally to the receiving satellite RS (3,3) on the orbit $O_3$ and the satellite line $LOS_3$.

The rules by which the data packet is sent from a transmitting satellite TS to a particular receiving satellite RS can be learned and memorized in the respective satellites S so that a routing path does not have to be searched for again for subsequent data transmissions involving the same receiving satellite RS. This will be done until such time as the routing path changes, for example, because the satellites S have crossed the north pole NP or the south pole SP and the orbits $O_1, \ldots, O_5$ have crossed over each other, so that the mutual positions of neighboring satellites within the satellite constellation have changed, and then the previously memorized rules are discarded and a new transmission path to the particular receiving satellite RS is determined.

As a satellite S approaches the geographical north pole NP or south pole SP, for example, a communication with its associated neighboring satellite of its right-hand, e.g., eastern neighboring orbit or its left-hand, e.g., western neighboring orbit is not possible, since the orbits $O_1, \ldots, O_5$ cross each other in the region of the poles NP, SP. In this case, the method according to the invention still advantageously ensures a simple topological routing of the data packets, in that the data is at first relayed from the particular satellite S in the direction of a preceding satellite or a following satellite, not located near the poles, from which a further routing to a topologically neighboring satellite on another neighboring orbit is possible with no problems.

A second exemplary embodiment of a method according to the invention for the packet relaying of data, in which data packets are relayed from a mobile terrestrial terminal device, such as a satellite telephone, through satellites to another mobile terrestrial terminal device, shall be described in the following with the aid of FIG. 3.

For example, if a mobile terminal device such as a satellite telephone, positioned on the earth E, connects to a satellite S of the satellite constellation in whose coverage territory it is located, and establishes a communication with the satellite S, a distinct communication address will be assigned to this terminal device by the satellite S. For example, this may be a distinct IP address, which remains assigned to the terminal device, for example even when it is in the coverage territory of another satellite S at a later time.

FIG. 3 shows a terminal device as the transmitting terminal device SE, which relays a data packet, being sent to a receiving terminal device EE, to the transmitting satellite TS in whose coverage territory it is situated. The data packet contains a communication address assigned to the receiving terminal device EE and the transmitting satellite TS determines a receiving satellite RS which is in data communication with the receiving terminal device EE having the respective communication address.

In order to determine the receiving satellite RS, the transmitting satellite TS in one variant can make a query to all the satellites S of the satellite constellation, for example, in order to determine the satellite with which the receiving terminal device EE is currently registered. In response to its query, the transmitting satellite TS receives a message from each satellite S of the satellite constellation as to whether the particular receiving terminal device EE is currently registered with it or not. This likewise involves a high data traffic between the individual satellites of the satellite constellation.

Figure 4:
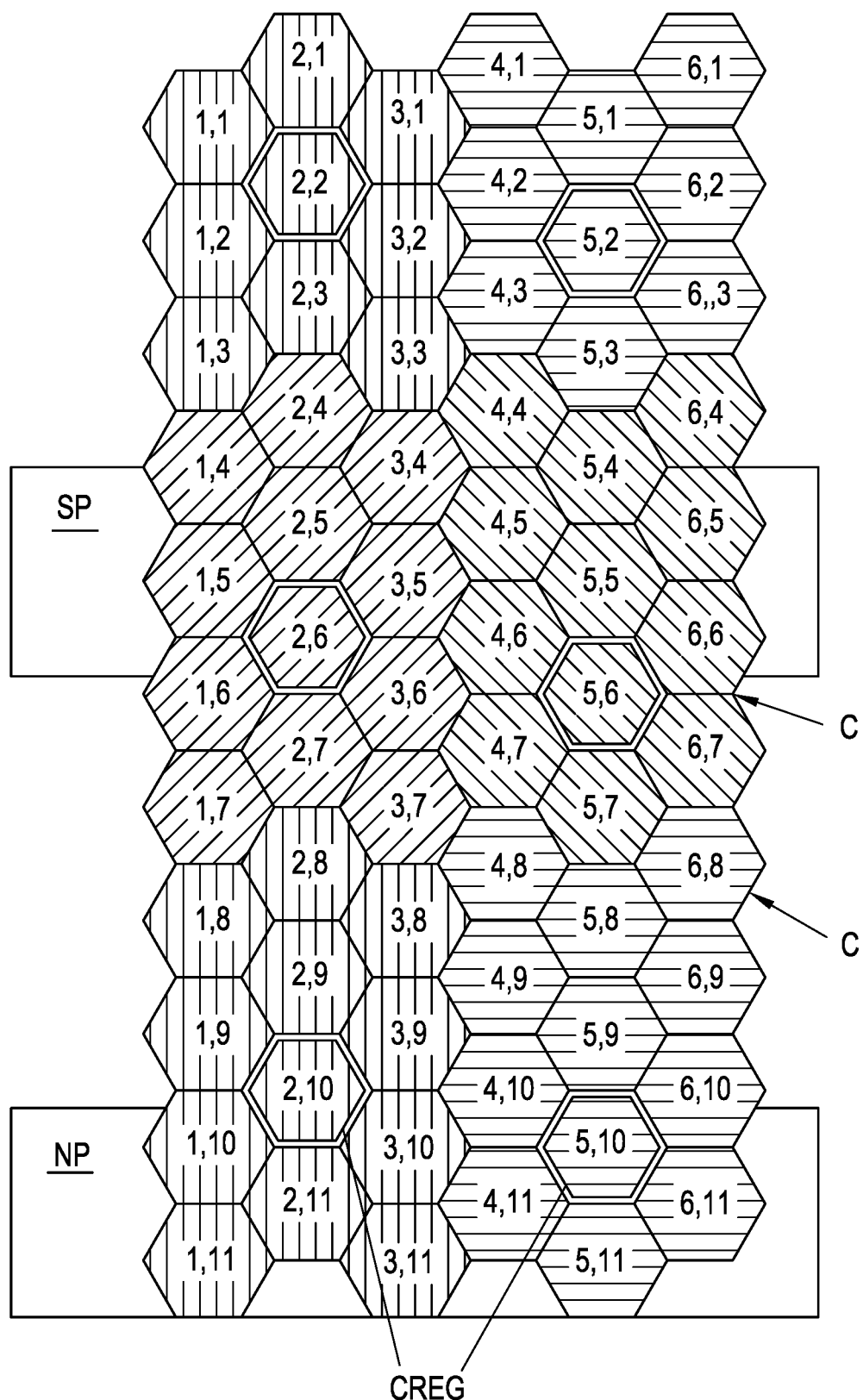
FIG. 4 is an illustration showing an example of a partitioning of the satellite constellation of FIG. 1 and FIG. 2 into clusters.

The individual satellites S in the satellite constellation may also be divided into clusters C, each time determining one of the satellites S of the cluster C to be a cluster registration satellite CREG. Such a partitioning of the satellite constellation into clusters C is represented in FIG. 4. The satellite constellation represented in FIG. 4 contains six orbits $O_1, \ldots, O_6$ and eleven satellite lines $LOS_1, \ldots, LOS_{11}$. The satellites S of the satellite constellation are indicated in FIG. 4 by their respective coordinate values within the satellite constellation and assembled in six clusters C, each of them comprising multiple satellites S. The satellites S belonging to the same cluster C are shown by the same hatching in FIG. 4. The cluster registration satellite CREG of each cluster C is shown by a double border each time.

The polar regions around the geographical south pole SP and the geographical north pole NP are shown schematically in FIG. 4. As can be seen, such a partitioning of the satellite constellation into clusters C ensures a flat coverage even in the polar regions.

If individual terminal devices stand in data communication with a satellite S of a cluster C, these terminal devices are advantageously registered by satellites S only with the cluster registration satellite CREG. This means that each satellite S only needs to send to the cluster registration satellite CREG information as to which or how many terminal devices are currently in data communication with it, which means a definite reduction in the data traffic between the satellites S of the satellite constellation.

The procedure for a registration of, for example, a transmitting terminal device SE that is not yet registered at the moment with any satellite S, is as follows:

If a transmitting terminal device SE connects for example to a first satellite $S_1$, the first satellite $S_1$ will register the transmitting terminal device SE at the cluster registration satellite CREG responsible for the first satellite $S_1$. The cluster registration satellite CREG now has information as to the satellites S by which the transmitting terminal device SE can be reached. This is required in order for a cluster registration satellite CREG to send a positive response to a querying satellite S, so that new and temporarily saved data can then be sent from the transmitting terminal device SE to the receiving terminal device EE. The registration process for a receiving terminal device EE occurs in similar fashion.

If a satellite S moves onward, so that a terminal device with which the satellite S was previously in communication is now no longer in its coverage territory, a handover of the terminal device will occur through the cluster registration satellite CREG. This procedure is explained in the following.

For example, a first terminal device as the transmitting terminal device SE is in data communication with a first satellite $S_1$ and a second terminal device as a receiving terminal device EE with a second satellite $S_2$, and data packets are relayed from the transmitting terminal device SE to the receiving terminal device EE. During this relaying of data packets, the receiving terminal device EE switches from the coverage territory of the second satellite $S_2$ to the coverage territory of a third satellite $S_3$.

If the receiving terminal device EE leaves the coverage territory of the second satellite $S_2$, the receiving terminal device EE will be deregistered by the satellite $S_2$ from the cluster registration satellite CREG responsible for the second satellite $S_2$. The cluster registration satellite CREG responsible for the second satellite $S_2$ now no longer has any information as to where the receiving terminal device EE is located, and neither do any other cluster registration satellites CREG in the satellite constellation have any information about this.

The second satellite $S_2$ sends a message to all satellites S of all communication partners of the receiving terminal device EE, i.e., in this particular instance, to the first satellite $S_1$, since the transmitting terminal device SE was connected to the receiving terminal device EE via the second satellite $S_2$, and the satellites S thereupon delete their routing information for the receiving terminal device EE.

The transmitting terminal device SE now attempts to send data once more to the receiving terminal device EE. However, the first satellite $S_1$ has no routing information for the receiving terminal device EE, since this has been deleted. Therefore, the first satellite $S_1$ sends a query to all cluster registration satellites CREG of the satellite constellation to which satellite the receiving terminal device EE is connected. During this period, the data from the transmitting terminal device SE to the receiving terminal device EE is saved temporarily at the first satellite $S_1$. If its queries to a cluster registration satellite CREG are not answered, the query to this cluster registration satellite CREG will be repeated, e.g., for a maximum of three times.

The cluster registration satellites CREG respond either affirmatively, i.e., a satellite S with which the receiving terminal device EE now stands in communication has been found by this cluster registration satellite CREG, or negatively, i.e., no satellite S with which the receiving terminal device EE stands in communication could be found. If all cluster registration satellites CREG have responded negatively, or if no responses have been received despite repetitions, the temporarily saved data is discarded by the first satellite $S_1$.

The first affirmative response of a cluster registration satellite CREG is used by the first satellite $S_1$ to determine the receiving satellite RS. In the specific example, this is the third satellite $S_3$. All other responses from cluster registration satellites CREG, whether affirmative or negative, that arrive after this first affirmative response at the first satellite $S_1$, will be ignored by it. Also, any still pending repetitions will be terminated. The data for the receiving terminal device EE temporarily saved by the first satellite $S_1$ will then be routed to the third satellite $S_3$ as the receiving satellite RS.

If a satellite S sends a message to all satellites S of all communication partners of a receiving terminal device EE that the receiving terminal device EE is no longer in communication with it, the communication between the transmitting terminal device SE and the receiving terminal device EE will be interrupted, but the data being routed will be saved temporarily.

Such a process generally lasts for only a few 100 milliseconds, for example. The waiting time for the response of the cluster registration satellites CREG or the number of repetitions of the queries and the waiting time between repetitions may be chosen such that no data loss occurs during the time window between the reporting that the receiving terminal device is no longer in communication with a particular satellite S and an affirmative response of a cluster registration satellite CREG.

The method is symmetrical, i.e., the described process also holds for a relaying of data from the receiving terminal device EE to the transmitting terminal device SE.

Now, if a data transmission is to occur between two terminal devices via the satellite constellation, the transmitting satellite TS can especially easily determine the receiving satellite RS in data communication with the receiving terminal device EE, as compared to the previously described variant of a query sent to all satellites S of the satellite constellation, since the transmitting satellite TS only needs to send such a query to the individual cluster registration satellites CREG of the satellite constellation. This procedure advantageously results in a further reduction in the data traffic between the satellites S of the satellite constellation.

If a cluster registration satellite CREG has information that the receiving terminal device EE is in data communication with a satellite S associated with the cluster C of the cluster registration satellite CREG, the cluster registration satellite CREG will relay the coordinate values of this receiving satellite RS to the transmitting satellite TS. The transmitting satellite TS then establishes a data link with the receiving satellite RS having so reported, in order to produce the data communication.

The data packet being relayed is sent, as previously described, in a series of single transmissions, as has been already described, to the receiving satellite RS, from which the data packet is further relayed to the receiving terminal device EE on the earth E.

If a terminal device leaves the coverage territory of a particular satellite S, it will send information about this to the cluster registration satellite CREG. The particular satellite S also sends this message to all other satellites S which are serving a receiving terminal device EE with which the transmitting terminal device SE was in communication.

In addition or alternatively, the cluster registration satellite CREG can in this case relay messages to the other satellites S in whose coverage territory are located terminal devices that are currently in data communication with the particular terminal device. If the cluster registration satellite CREG also sends this information in addition to the respective satellite S, this will contribute to increasing the reliability.

The respective satellites S will remove the information saved regarding the routing path to this terminal device and make a new query to the cluster registration satellite CREG as to which of the satellites S of the cluster C the terminal device is currently in data communication.

Figure 5:
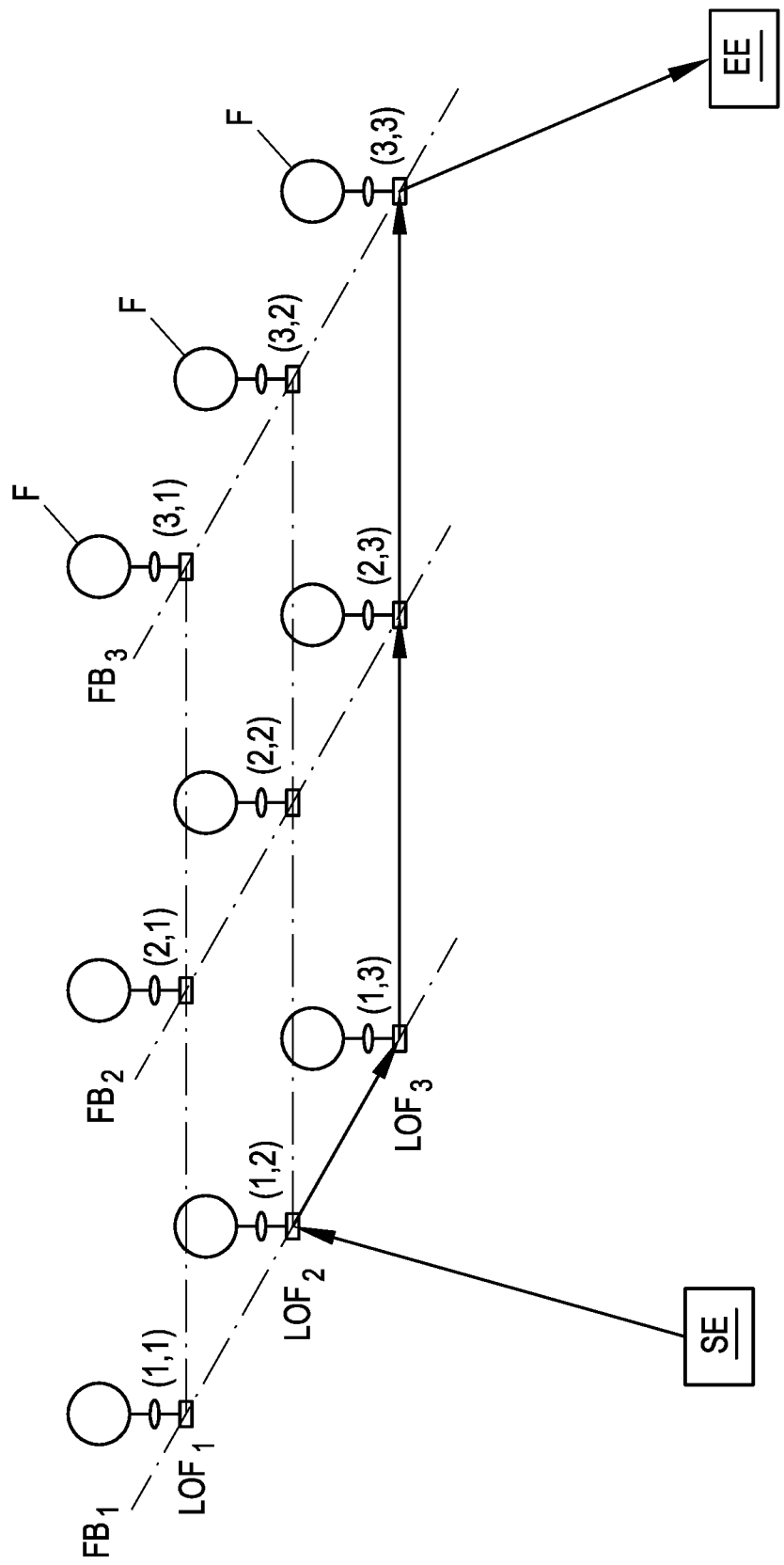
FIG. 5 is a schematic representation of a swarm of flying objects moving along flight paths.

FIG. 5 shows a schematic representation of a swarm of flying objects F, such as can be used for a method of packet transmission of data according to the invention. In the exemplary embodiment in FIG. 5, the flying objects F are high-altitude platform stations or high-altitude pseudo-satellites (HAPS) flying in a dynamic constellation, i.e., unmanned flying objects, such as are described for example at https://en.wikipedia.org/wiki/High-altitude_platform_station, retrieved on 28 Feb. 2019. Such high-altitude platform stations can form dynamic constellations, where the swarm geometry can be used to determine the coordinate values for the routing of data packet, as is described in FIG. 2 and FIG. 3 for the exemplary embodiment with a satellite constellation.

Such a swarm of flying objects F may be used, for example, to provide a network connectivity for the first time in remote regions of the earth or to provide a temporary network connectivity for rescue efforts on the ground during a crisis situation, such as a natural disaster.

The flying objects F each move within the given swarm of flying objects F, as can be seen in FIG. 5, on closed flight paths $FB_1, \ldots, FB_3$, for example, and they are arranged in a grid characterized by a number of flight paths $FB_1, \ldots, FB_3$ and lines of flying objects $LOF_1, \ldots, LOF_3$. In the same way as was explained above for an exemplary embodiment with a satellite constellation per FIG. 1 to 4, each time a number of flying objects F are arranged at equal distances in succession on each flight path $FB_1, \ldots, FB_3$ in a swarm of flying objects F. Each of these flying objects F is in communication respectively with a preceding flying object and a following flying object.

Furthermore, the individual flying objects F of a flight path $FB_1, \ldots, FB_3$ are associated respectively with an associated neighboring flying object of a right-hand neighboring flight path looking in the flight direction and an associated neighboring flying object of a left-hand neighboring flight path looking in the flight direction, with which the respective flying object is in communication at least for a portion of the flight path $FB_1, \ldots, FB_3$. At the margins of the swarm, the particular flying objects F, as previously explained for the satellite constellation, are only in communication with a right-hand or left-hand neighboring flying object.

As can be seen in FIG. 5, each of the flying objects F is assigned coordinate values within the swarm based on its position within the grid of flight paths $FB_1, \ldots, FB_3$ and flying object lines $LOF_1, \ldots, LOF_3$. In the exemplary embodiment shown in FIG. 5, there are two coordinate values which indicate a two-dimensional position within the swarm. Alternatively, the actual geoposition of the individual flying objects F can be used, i.e., the longitude and latitude of its current position.

With a method according to the invention, by means of such a swarm of flying objects F, data packets can be relayed between mobile and/or stationary terminal devices through the flying objects F of the swarm.

In the exemplary embodiment of FIG. 5, for example, the flying object F with the coordinate values (1,2) obtains a data packet from a mobile transmitting terminal device SE and determines from the data being routed that the flying object with the coordinate values (3,3) is the receiving flying object RF. Now, in order to send the data packet on the fastest path from the flying object (1,2) to the flying object (3,3), the data packet is relayed at first in a series of single transmissions to the neighboring flying object F (1,3) on the same flight path $FB_1$ and the neighboring flying object line $LOF_3$. The data packet is then relayed to the flying object F (2,3) on the flight path $FB_2$ and the flying object line $LOF_3$, and finally to the receiving flying object (3,3) on the flight path $FB_3$ and the flying object line $LOF_3$.

In the same way as was described above for a satellite constellation, the flying objects F of a swarm can also be divided into clusters, each time one of the flying objects F of the cluster being determined to be a cluster registration flying object. If individual terminal devices are in data communication with a flying object F of the cluster, these terminal devices will advantageously only be registered by the flying objects F at the cluster registration flying object and data transmission or queries regarding the registration of terminal devices can be done also for flying objects in the manner already described for satellites.

Alternatively, such a swarm of flying objects F may also be a drone swarm, for example.

The invention claimed is:

1. A method for packet transmission of data between at least two terminal devices via at least one flying object, wherein:

flying objects are moving within a given swarm of the flying objects;

the swarm of flying objects having a plurality of the flying objects which are respectively moving on flight paths;

the flying objects are disposed in a grid being characterized by a number of the flight paths;

a number of the flying objects are moving in succession on each flight path, so that each of the flying objects of the flight path is in respective communication with a preceding flying object and a following flying object;

the flying objects are moving on multiple ones of the flight paths such that each time there are disposed in a given orientation to a respective flight path an associated neighboring flying object of a right-hand neighboring flight path looking in a flight direction and an associated neighboring flying object of a left-hand neighboring flight path looking in the flight direction, they are in communication with a respective flying object for at least a portion of the flight path;

which comprises the steps of:

determining one flying object from the swarm of the flying objects to be a reference flying object;

assigning each of the flying objects a position, the assigning step further comprises the substeps of;

wherein the flying objects which are situated on a same flight path are assigned a same coordinate value of a first coordinate;

wherein the flying objects which are in communication with each other as associated neighboring flying objects of the left-hand and the right-hand neighboring flight path are assigned a same coordinate value of a second coordinate;

deriving coordinate values of a receiving flying object within the swarm of the flying objects from a respective data packet being transmitted;

performing a number of sequential single transmissions for a transmittal of data between a transmitting flying object and the receiving flying object, wherein each single transmission within the swarm of the flying objects occurs only between two respective flying objects which are topologically neighboring and in direct communication with each other; and during a process of the single transmission from the respective flying object where the data packet is located that is being transmitted, a topologically neighboring flying object is selected with an aid of which a coordinate value of the receiving flying object which is derivable from the data packet is selected and the data packet is sent to a selected neighboring flying object; and bringing the at least two terminal devices positioned on ground into communication respectively with at least one of the flying objects from the swarm of the flying objects, each of the terminal devices being assigned respectively one communication address;

sending the data packet from one of the terminal devices functioning as a transmitting terminal device to a respective other one of the terminal devices functioning as a receiving terminal device, the data packet containing the communication address assigned to the receiving terminal device;

relaying the data packet by the transmitting terminal device to one of the flying objects as the transmitting flying object;

determining the receiving flying object by the transmitting flying object, which stands in data communication with the receiving terminal device;

relaying the data packet from the transmitting flying object to the receiving flying object; and relaying the data packet from the receiving flying object to the receiving terminal device; and dividing the flying objects of the swarm of the flying object into clusters, each time one of the flying objects of the cluster being determined to be a cluster registration flying object;

registering the terminal devices which stand in data communication with a flying object of the cluster through the flying object with the cluster registration flying object;

establishing a data link in an event that the data link is to be established with the further sub-steps of:
sending a query from the transmitting flying object to individual cluster registration flying objects as to whether a particular receiving terminal device stands in the data link with the flying object associated with the cluster registration flying object; and
sending back any coordinate values of the receiving flying object regarding the query by the cluster registration flying object to the transmitting flying object based on the query; and
establishing the data link by the transmitting flying object to the receiving flying object having so reported back, in order to bring about the data communication.

2. The method according to claim 1, wherein:
the flight paths are closed flight paths;
the flying objects moving in succession are equidistant from each other;
the position is a two-dimensional position containing two coordinate values within the swarm of the flying objects based on its position relative to the reference flying object; and
the topologically neighboring flying object is a neighboring flying object or preceding flying object or following flying object.

3. The method according to claim 1, wherein the communication address is a distinct address.

4. The method according to claim 1, wherein the coordinate values are two-dimensional coordinate values.

5. A method for packet transmission of data between at least two terminal devices via at least one satellite from a group of satellites, wherein:
the satellites are moving within a given satellite constellation around earth;
the given satellite constellation contains the satellites are respectively moving on a non-geostationary orbit around the earth;
individual ones of the satellites are disposed in a grid which is characterized by a number of orbits; and
an orbit extends respectively in a circle or ellipse around the earth;

which comprises the steps of:
moving a number of the satellites in succession on each of the orbits, so that each of the satellites of the orbit, is in respective communication with a preceding orbital satellite and a following orbital satellite;

moving the satellites on multiple said orbits, such that each time there are disposed in a given orientation to a respective orbit an associated neighboring satellite of a right-hand neighboring orbit looking in a flight direction and an associated neighboring satellite of a left-hand neighboring orbit looking in the flight direction and are in communication with a respective satellite for at least a portion of the orbit;

determining one satellite from the given satellite constellation to be a reference satellite;

assigning each of the satellites a position, the assigning step includes the substeps of;
assigning the satellites which are situated on a same orbit a same coordinate value of a first coordinate;
assigning the satellites which are in communication with each other as associated neighboring satellites of the left-hand and the right-hand neighboring orbit a same coordinate value of a second coordinate;

deriving coordinate values of a receiving satellite within the given satellite constellation from a respective data packet being transmitted;

performing a number of sequential single transmissions for the transmittal of data between a transmitting satellite and the receiving satellite, wherein each single transmission within the given satellite constellation occurs only between two respective said satellites which are topologically neighboring and in direct communication with each other; and selecting, during a process of the single transmission from a respective satellite where the data packet is located that is being transmitted, a topologically neighboring satellite with an aid of which the coordinate value of the receiving satellite which is derivable from the data packet is selected and the data packet is sent to a selected neighboring satellite; and bringing at least two terminal devices positioned on ground into communication respectively with at least one of the satellites of the given satellite constellation, each of the terminal devices being assigned respectively one communication address;

sending the data packet from one of the terminal devices as a transmitting terminal device to a respective other one of the terminal devices as a receiving terminal device, the data packet containing a communication address assigned to the receiving terminal device;

relaying the data packet by the transmitting terminal device to one of the satellites as a transmitting satellite;

determining a receiving satellite by the transmitting satellite, which stands in data communication with the receiving terminal device;

relaying the data packet from the transmitting satellite to the receiving satellite; and relaying the data packet from the receiving satellite to the receiving terminal device; and diving individual ones of the satellites of the given satellite constellation into clusters, each time one of the satellites of the cluster being determined to be a cluster registration satellite;

registering individual ones of the terminal devices which stand in data communication with a satellite of the cluster through the satellite with the cluster registration satellite;

establishing a data link in an event that the data link is to be established by the substeps of:
  sending a query from the transmitting satellite to individual ones of cluster registration satellites as to whether a particular receiving terminal device stands in the data link with the satellite associated with the cluster registration satellite; and
  sending back any coordinate values of a receiving satellite regarding the query back by the cluster registration satellite to the transmitting satellite based on the query; and
establishing the data link by the transmitting satellite to the receiving satellite having so reported back, in order to bring about the data communication.

6. The method according to claim 5, wherein:
the orbit extends on one side of the earth from a first pole to an opposite second pole and then on an other side of the earth from the second pole to the first pole;
the satellites moving in succession are equidistant from each other;
the position is a two-dimensional position having two coordinate values within the given satellite constellation based on its position relative to the reference satellite; and
the topologically neighboring satellite is a neighboring satellite or a preceding satellite or a following satellite.

7. The method according to claim 5, wherein the communication address is a distinct address.

8. The method according to claim 5, wherein the coordinate values are two-dimensional coordinate values.

* * * * *